(12) United States Patent
Tiemann et al.

(10) Patent No.: US 11,867,987 B1
(45) Date of Patent: Jan. 9, 2024

(54) PHASE-CONTROLLED BEAM COMBINERS

(71) Applicant: LOCKHEED MARTIN CORPORATION, Bethesda, MD (US)

(72) Inventors: Bruce G. Tiemann, Longmont, CO (US); Philip Gatt, Berthoud, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 970 days.

(21) Appl. No.: 16/796,852

(22) Filed: Feb. 20, 2020

Related U.S. Application Data

(60) Provisional application No. 62/929,679, filed on Nov. 1, 2019.

(51) Int. Cl.
*G02F 1/01* (2006.01)
*G02B 3/00* (2006.01)
*G02B 27/10* (2006.01)

(52) U.S. Cl.
CPC ............. *G02F 1/01* (2013.01); *G02B 3/0037* (2013.01); *G02B 27/106* (2013.01); *G02F 1/0121* (2013.01); *G02F 2203/50* (2013.01)

(58) Field of Classification Search
None
See application file for complete search history.

(56) References Cited

U.S. PATENT DOCUMENTS

| | | | | |
|---|---|---|---|---|
| 2015/0138618 A1* | 5/2015 | Hamamoto | ........... | H01S 3/2383 359/239 |
| 2016/0266244 A1* | 9/2016 | Holmes | .................. | G01S 17/66 |
| 2017/0336656 A1* | 11/2017 | Anderson | ............... | G02F 1/015 |

* cited by examiner

*Primary Examiner* — Darryl J Collins
*Assistant Examiner* — Tamara Y. Washington
(74) *Attorney, Agent, or Firm* — BAKERHOSTETLER (57) ABSTRACT

A heterodyne phase-controlled beam-combiner system includes a laser source, a first beam splitter, a plurality of phase modulators, a tiled array and an optical mixer. The laser source generates a light beam, and the first beam splitter splits the light beam into multiple beamlets. A phase modulator tags each beamlet with an arbitrary phase dither signal corresponding to an arbitrary phase setpoint or offset, and a tiled array, including a number of lenslets, combines the tagged beamlets and directs the combined light to a second beam splitter. The optical mixer generates a heterodyne light including tagging information. A first output light of the second beam splitter is a target light directed to a target, and the arbitrary phase offset enables achieving a nonflat phase profile for beamlets to obtain the desired on-axis far-field intensity of the target light.

19 Claims, 7 Drawing Sheets

PHASE-CONTROLLED BEAM COMBINERS

CROSS-REFERENCE TO RELATED APPLICATIONS

This application claims the benefit of priority under 35 U.S.C. § 119 from U.S. Provisional Patent Application 62/929,679 filed Nov. 1, 2019, which is incorporated herein by reference in its entirety.

STATEMENT REGARDING FEDERALLY SPONSORED RESEARCH OR DEVELOPMENT

Not Applicable.

FIELD OF THE INVENTION

The present invention generally relates to satellite communication and, more particularly, relates to phase-controlled beam-combining systems and methods.

BACKGROUND

There are several uses for tiled apertures in transmitting light, including free-space optical communication and directed-energy applications. In some cases, for example, in space, where there is no atmosphere, achieving the phase profile that maximizes an on-axis far-field intensity may require that all the subapertures of a tiled aperture be at the same phase. However, in general, in the presence of atmospheric distortions, for optimum far-field intensity at a given location, the desired transmit phase profile will not be flat.

SUMMARY

According to various aspects of the subject technology, methods and systems are disclosed for phase-controlled beam combining.

In one or more aspects, a heterodyne phase-controlled beam-combiner system includes a laser source, a first beam splitter, a plurality of phase modulators, a tiled array and an optical mixer. The laser source generates a light beam, and the first beam splitter splits the light beam into multiple beamlets. A phase modulator tags each beamlet with an arbitrary phase dither signal. The phase dither signal corresponds to an arbitrary phase setpoint or offset. A tiled array, including a number of lenslets, combines the tagged beamlets and directs the combined light to a second beam splitter. The optical mixer generates a heterodyne light, including tagging information. A first output light of the second beam splitter is a target light directed to a target, and the arbitrary phase signal enables achieving a nonflat phase profile for beamlets to achieve a desired on-axis far-field intensity at a location of the target.

In other aspects, a homodyne phase-controlled beam-combiner system includes a first beam splitter, a number of phase modulators, a tiled array and an inphase-quadrature (IQ) receiver. The first beam splitter splits a light beam into multiple beamlets, and a phase modulator tags each beamlet with an arbitrary phase dither signal. The arbitrary phase dither signal corresponds to an arbitrary phase setpoint or offset. A tiled array, including a number of lenslets, combines the tagged beamlets to form a combined light and directs the combined light to a second beam splitter. An IQ receiver generates inphase (I) and quadrature (Q) light signals, including tagging information. A first output light of the second beam splitter is a target light directed to a target. The arbitrary phase offset enables achieving a phase profile for beamlets that produces a desired on-axis far-field intensity of the target light.

In yet other aspects, a method of combining phase-controlled beams includes splitting a light beam of a laser source into a number of beamlets, and tagging each beamlet and imposing upon each of them an arbitrary phase signal corresponding to an arbitrary phase setpoint or offset. The method also includes combining tagged beamlets to form combined light and directing the combined light to a second beam splitter to produce a target light directed to a target and an auxiliary light. The method further includes focusing the auxiliary light to form a far-field proxy light, and mixing the far-field proxy light with an optical local oscillator (LO) to generate a light signal including tagging information. A phase-control signal is generated based on the light signal. The phase-control signal is used for changing the phase of each beamlet.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of this detailed description, which includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

Reference is made to U.S. Pat. Nos. 7,583,711, 7,817,688 and U.S. Pub. No. 2006/0192970, the entirety of each of which is hereby incorporated herein by reference.

In some aspects of the present technology, methods and configurations are disclosed for phase- and polarization-controlled beam combining. The subject technology allows for measurement, and hence control, of arbitrary phase profiles using local measurement. The disclosed solution removes latency issues but allows any profile to be written. The subject solution is also compatible with digital holography (DH) approaches, which determine the necessary subaperture phase values by use of a sharpening metric and report out the desired phases to a phase-control system. In the application of tiled apertures for light in free-space optical communication, to maximize on-axis far-field intensity, the phase profile of all subapertures of the tiled apertures have to be at the same phase. However, in general, in the presence of atmospheric distortions, for optimum far-field intensity at a given location, the desired transmit phase profile cannot be flat. Alternatively, a far-field intensity distribution may be desired that isn't maximized at any given location, but, rather, has some other favorable distribution.

A common way of managing this is to first co-phase all the subapertures of a tiled array together and then reflect the beams from the tiled array off of a deformable mirror, which essentially writes a phase correction term across the entire array to compensate for the atmospheric phase distortion. However, it can be desirable to dispense with the deformable mirror, which requires the phase corrections to be individually made at the subaperture level. Under certain conditions, a locking of optical coherence via the single-detector electronic-frequency tagging (LOCSET) method can be used to control the phase. In the case of shallow turbulence, the phases needing correction are necessarily small (e.g., "shallow turbulence"), and approaches such as LOC SET can still work, simply by altering the phase setpoints to values close to zero phase for each subaperture. However, in the case of deep turbulence, a subaperture may be $\pi$ out of phase with other subapertures in the array, leading to difficulties with the LOCSET approach. Furthermore, some phase-control algorithms may work well only in a limited range (linear range) around zero phase (e.g., within the small angle approximation in which $\sin(x) \sim x$, in which case a level-seeking servo could lose control if the setpoint moved more than 90 degrees away from zero phase). What is sought, then, is an approach to control the phase of each beam, out of a large number of beams, relative to each other, with arbitrary and independent phase control within a phase value ranging from 0 to $2\pi$.

The subject technology provides a system in which each beamlet (from a tile of a tile array) is separately tagged with a unique frequency of phase modulation. The angle of this modulation is small enough so as to not cause significant loss of on-axis intensity, but is large enough to obtain ample signal-to-noise at the bandwidths for which phase corrections are sought. The frequencies should be far enough apart to enable Nyquist-limited information bandwidths sufficient to achieve the phase correction that is being sought to suppress. The near-field beam is brought to a focus and the light at the center is then brought into an optical single sideband detector using an external local oscillator (LO) with the same optical frequency as the light being detected. For example, the LO light can be made circularly polarized, and the target light can be made linearly polarized at 45 degrees relative to a reference plane (e.g., horizontal), and these beams can be combined on a nonpolarizing beam splitter. The beams can then be separated on a polarizing beam splitter that is aligned with the reference plane. Because the inphase (I) and quadrature (Q) components of the circularly polarized beam are 90 degrees apart, they will split with that phase difference on the polarizing beam splitter, but the two components of the target beam will split in phase on this optic, leading to beams with I and Q components in different directions.

For the homodyne detection case, by the use of two photodetectors, the I and Q components can be separately detected, allowing reconstruction of the full complex phase of the target light. Because the light from the different subapertures is uniquely tagged with different frequencies, the phase of each beam relative to the LO phase can be separately deduced for each beamlet. Preferably, the phase-modulation frequency will be high enough to avoid overlap with technical intensity noise typically occurring at direct current (DC) and low audio frequencies. Once the phases are known, error signals can be derived showing which beams/beamlets go to zero at the desired phase, and, for example, which ones are positive if the phase error is positive, or are negative if the phase error is negative, in a linear region around the zero point, which would be ideal for servo control of the optical phase.

For the heterodyne detection case, each beamlet is separately phase modulated with a unique carrier frequency, again with enough frequency separating each tone for necessary information bandwidths, and with just-large-enough phase angle modulation to avoid significant loss of on-axis intensity, but, still be out of shot noise. In this case, the LO is brought in at an offset frequency, resulting in a heterodyne tone being generated. However, this tone will have phase modulation sidebands on it at all of the subaperture dither frequencies, with the phase of these modulations identifying the phases of each beamlet relative to the LO. Measurement of the phases of all of these tones again results in knowledge being obtained about the phases of each of the beams, relative to the LO, with no limit of what that phase might be. Once the phases are known, error signals can be derived, showing which beamlet phase errors go to zero at the desired phase, and, for example, are positive if the phase error is positive, and negative if the phase error is negative, in a linear region around the zero point, which would be ideal for servo control of the optical phase. In either case, then, the phases are controlled to equal the desired phases. Since in both cases the phases can be measured at any angle around $0$-$2\pi$ (unlike the case with LOCSET), the phases can be controlled to any value desired. Notably, it is possible to use either method to control the phases of a group of subapertures to be $\pi$ out of phase with others, such that there is zero on-axis intensity at the focus of the far-field proxy, without loss of lock, or alteration of the gain or any other problem being caused. Therefore, even the phase perturbations brought by deep turbulence could be corrected for.

Conventional phase measurement solutions include the use of LOCSET or stochastic parallel gradient descent (SPGD). LOCSET can be optimal when the phase profile needing to be measured does not stray far from zero phase, and in particular, does not allow measurement of arbitrary phase profiles. SPGD allows for an iterative phase correction, however, this requires target-in-the-loop returns, which presents prohibitive latency issues in the case of distant targets.

The approach of the subject solution allows for measurement, and hence control, of arbitrary phase profiles using local measurement, removing latency issues, but allowing any profile to be written. The method is also compatible with DH approaches, which determine the necessary subaperture phase values by use of a sharpening metric and then report out the desired phases to a phase-control system.

Figure 1:
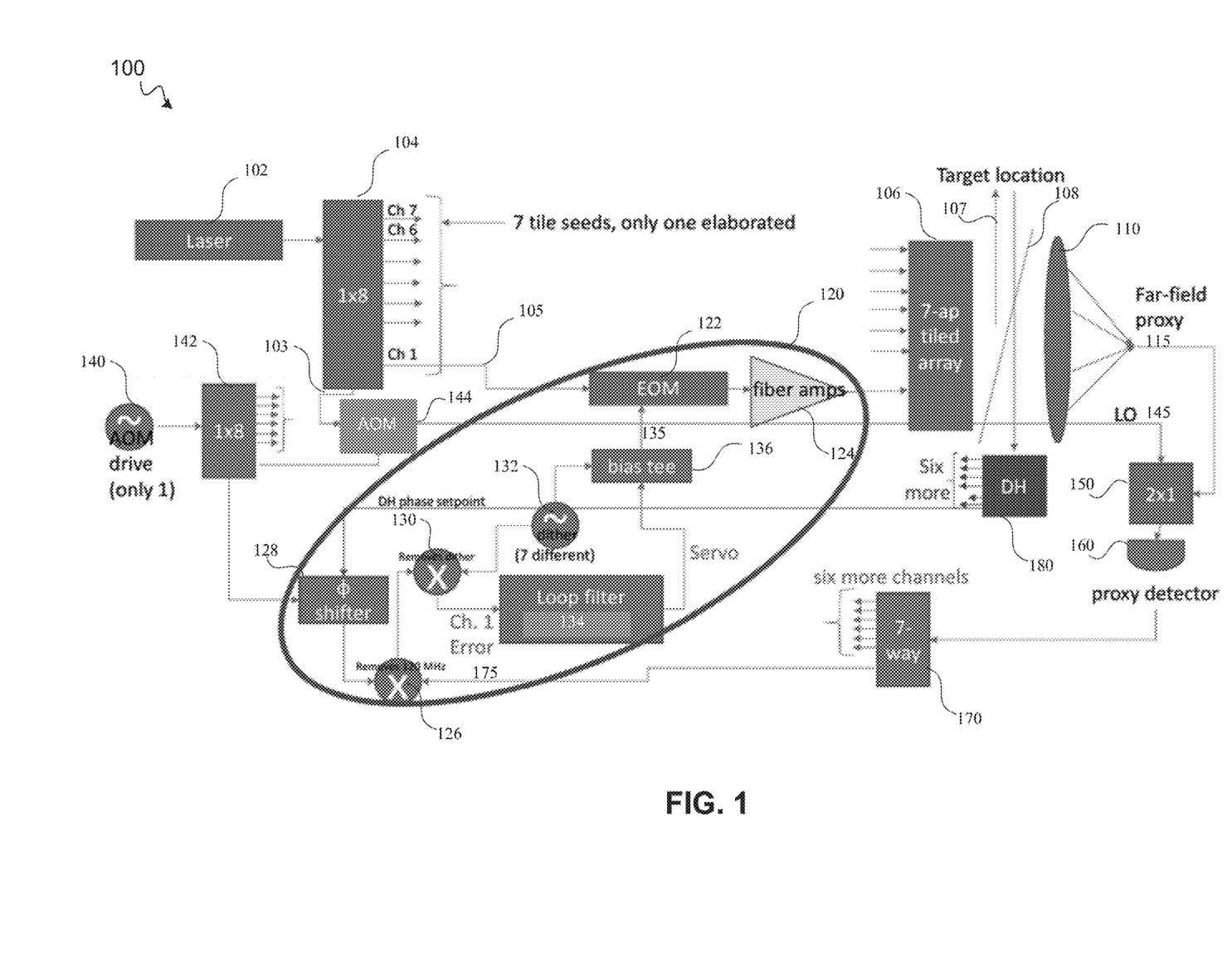
FIG. 1 is a schematic diagram illustrating an example hardware implementation of a digital holography (DH) mode, heterodyne phase-controlled beam-combining system, according to certain aspects of the disclosure.

FIG. 1 is a schematic diagram illustrating an example hardware implementation of a DH mode, heterodyne phase-controlled beam-combining system 100, according to certain aspects of the disclosure. The DH mode, heterodyne phase-controlled beam-combining system 100 (hereinafter "beam-combining system 100") includes a laser source 102, a first beam splitter 104, a multi-aperture tiled array 106 (hereinafter "tiled array 106"), a second beam splitter 108, a lens 110, multiple phase-modulator blocks (e.g., a phase-modulator block 120), a driver circuit 140, a first demultiplexer (Demux) 142, an acousto-optic modulator (AOM) 144, an optical mixer 150, a light detector 160, a second Demux 170 and a DH module 180. The phase-modulator block 120 includes a number of electronic circuits, including an electro-optical modulator (EOM) 122, an optical amplifier (e.g., a fiber amplifier) 124, a first mixer 126, a phase shifter 128, a second mixer 130, a dither generator 132, a loop filter 134 and a signal combiner 136.

The laser source 102 may be a high-power (e.g., a few kilowatt) laser source that generates a light beam for free-space optical communication or other applications such as directed-energy applications. The light beam generated by the laser source 102 is divided into multiple (e.g., eight or more) beamlets by the first beam splitter 104. One of the beamlets (e.g., 103) is directed to the AOM 144 and each beamlet (e.g., 105) of the other beamlets (e.g., seven channels: ch 1, ch 2 . . . ch 7) is directed through the EOM 122 and the optical amplifier 124 of the phase-modulator block 120 to the tiled array 106. The tiled array 106 is an array of lenslets, which may include, for example, seven tiles. In one or more aspects, the number of tiles in the tiled array 106 (e.g., a hexagonal array) is not limited to seven, and the array can comprise, for example, 19, 37, 61, 91, 127 or more tiles. In one or more aspects, the spatial geometry of the tiled array 106 may be rectangular, hexagonal, or in any other arrangement.

The EOM 122 is used to optically modulate the beamlet 105 with a phase-control signal 135 of the signal combiner 136 to tag the beamlet 105 with a unique frequency of phase modulation. The angle of this modulation is small enough so as to not cause significant loss of on-axis intensity of the beamlet 105, but is large enough to obtain sufficient signal-to-noise at the bandwidths for which phase corrections are sought. The frequencies should be far enough apart to enable Nyquist-limited information bandwidths sufficient to achieve the phase correction that is being sought to suppress. A person skilled in the art would also appreciate that optical phase can be controlled with methods other than using EOMs.

The tagged beamlets from the phase-modulator block 120 are forwarded to the lenslets of the tiled array 106, the light beams of which are split by the second beam splitter 108 to form a target light beam 107 and an auxiliary beam (not shown for simplicity) directed to the lens 110. The second beam splitter 108 may be, for example, a 90-10 or 95-5 splitter, so that the intensity of the auxiliary beam may be about 5 to 10 percent of the total intensity of the tagged beamlets. The target light beam 107 includes beamlets with phase profiles (nonflat) that can offset atmospheric distortions by maximizing an on-axis far-field intensity. The auxiliary beam is brought to focus by the lens 110 to form a far-field proxy light 115, which is a local copy of the far-field beam and is eventually used to generate the phase-control signal 135 for the EOM 122, as discussed herein. A person skilled in the art would appreciate that the lens 110 may not be necessary to determine the local phases of a plurality of beams relative to one another or relative to an LO beam.

The far-field proxy light 105 is combined with an LO light 145 by the optical mixer (2×1 combiner) 150 to generate a heterodyne light that is forwarded to the light detector 160 (proxy detector), which is an optical single-sideband detector. The LO light 145 has the same optical frequency as the light being detected. In one or more aspects, the LO light 145 can be made circularly polarized, and the target light beam 107 can be made linearly polarized at 45 degrees relative to a reference plane (e.g., horizontal), and these beams can be combined on a nonpolarizing optical mixer. The output light of the light detector 160 is a heterodyne electrical signal that includes the tagging information (frequency of phase modulation) of each of the beamlets 105 and is sent to the second Demux 170 (e.g., a seven-way Demux). An electrical signal for each output channel of the second Demux 170 is forwarded to a phase-modulator block such as the phase-modulator block 120.

The LO light 145 is generated by the AOM 144, which receives a radio-frequency (RF) signal from the first Demux 142 (e.g., a 1×8 Demux). A person skilled in the art would also appreciate that the LO light 145 can be generated by means other than AOM. 144. The first Demux 142 is driven by the driver circuit 140, which is an RF signal generator that generates an RF signal, for example, at 120 MHz.

Returning to the phase-modulator block 120 and its electronic circuits, the phase shifter 128 receives an RF signal from the first Demux 142, which has the same frequency (e.g., 120 MHz) as the RF signal of the AOM 144, and changes the phase of the RF signal based on a DH setpoint signal received from the DH module 180. The phase shifter 128 is able to generate a wide range of phase shifts (e.g., 0 degrees to 360 degrees). The output signal from the phase shifter 128 is used by the first mixer 126 to remove the RF signal (e.g., at 120 MHz) from an electrical signal 175 of the second Demux 170. The output of the first mixer 126 is sent to the second mixer 130, which removes the dither signal and generates an error signal that is filtered by the loop filter 134 to generate a DC-intermediate frequency (IF) servo-control signal (e.g., a low-frequency signal). The dither signal is generated by the dither generator 132 and is used by the second mixer 130 and the signal combiner 136. The signal combiner 136 receives the dither signal and servo-control signal and generates phase-control signal 135, which is a combination of the servo-control signal with the dither signal. The DH module 180 generates a number of (e.g., seven) DH phase setpoints, one for each phase-modulator block (e.g., phase-modulator block 120). The DH module 180 generates the DH phase setpoints based on an optical feedback signal from the target light beam 107.

Figure 2:
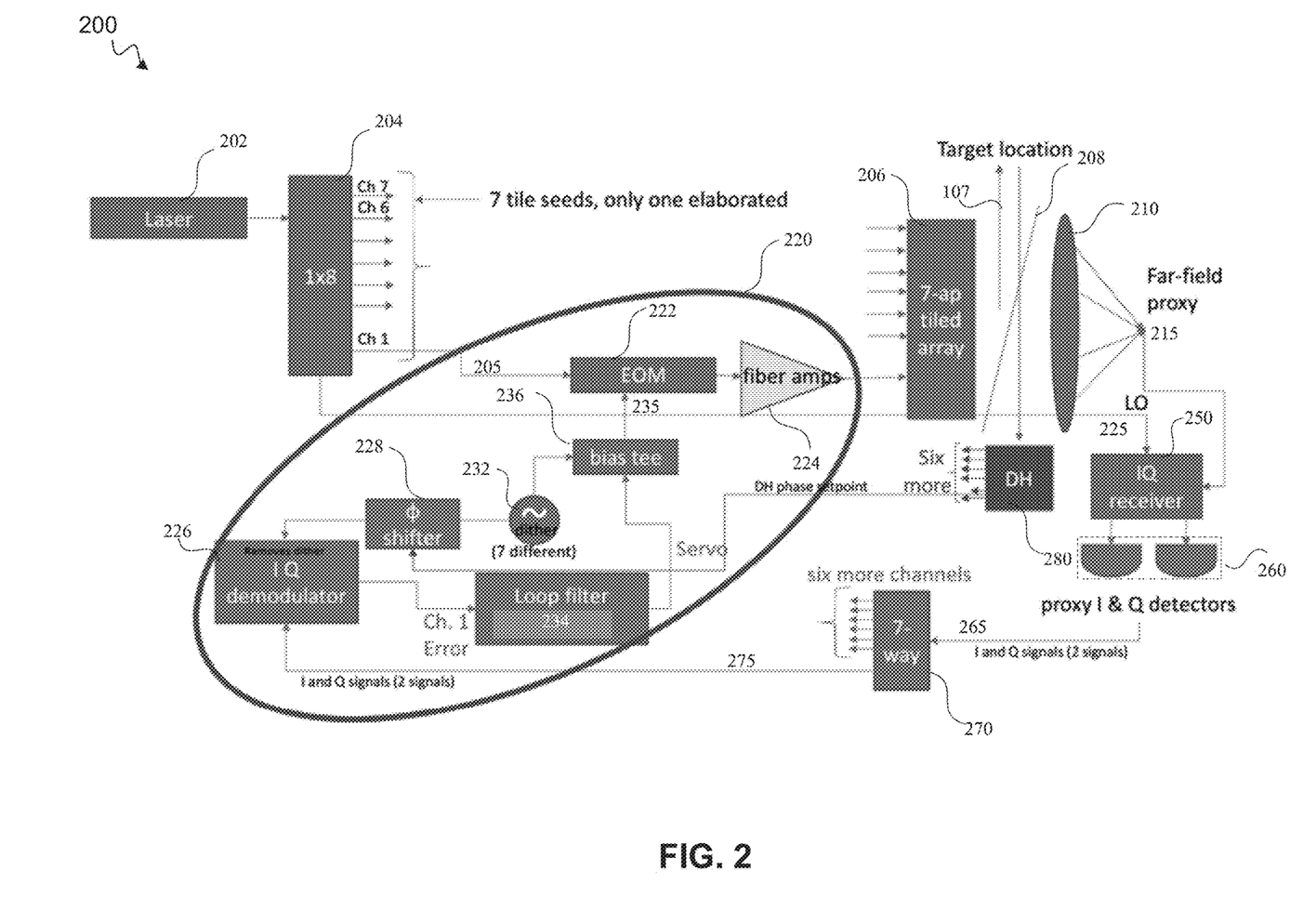
FIG. 2 is a schematic diagram illustrating an example hardware implementation of a DH mode, homodyne phase-controlled beam-combining system, according to certain aspects of the disclosure.

FIG. 2 is a schematic diagram illustrating an example hardware implementation of a DH mode, homodyne phase-controlled beam-combining system 200, according to certain aspects of the disclosure. The DH mode, homodyne phase-controlled beam-combining system 200 (hereinafter "beam-combining system 200") includes a laser source 202, a first beam splitter 204, a multi-aperture tiled array 206 (hereinafter "tiled array 206"), a second beam splitter 208, a lens 210, multiple phase-modulator blocks (e.g., a phase-modulator block 220), an inphase-quadrature (IQ) receiver 250, an IQ light detector 260, a Demux 270 and a DH module 280. The phase-modulator block 220 includes a number of electronic circuits including, an EOM 222, an optical amplifier 224, an IQ demodulator 226, a phase shifter 228, a dither generator 232, a loop filter 234 and a signal combiner 236.

The laser source 202, the first beam splitter 204, the tiled array 206, the second beam splitter 208 and the lens 210 are similar to the laser source 102, the first beam splitter 104, the tiled array 106, the second beam splitter 108 and the lens 110 of FIG. 1, respectively, and perform similar functionalities as discussed above with respect to FIG. 1.

The IQ receiver 250 receives the far-field proxy light 215 to mix with an LO light 225, which is an output beamlet of the first beam splitter 204. The far-field proxy light 215 is the focused light output of the lens 220. The IQ receiver 250 generates I and Q light signals that are converted by the I and Q light detector 260 to I and Q electrical signals 265, which are split into a number of (e.g., seven) I and Q channel signals 275. Each I and Q channel signal 275 is forwarded to the phase-modulator block 220 for further processing and generating a phase-control signal 235 that is applied to the EOM 222 to tag a beamlet 205 of the first beam splitter 204.

Returning to the phase-modulator block 220 and its electronic circuits, the phase shifter 228 receives a dither signal from the dither generator 232 and a DH set point signal from the DH module 280. The phase shifter 228 is able to generates a wide range of phase shifts (e.g., degrees to 360 degrees). The output signal from the phase shifter 228 is used by the IQ demodulator 226 to remove dither from the I and Q channel signals 275 of the Demux 270. The output of the I and Q channel signals 275 is a channel error signal that is forwarded to the loop filter 234 to remove high-frequency components and generate a servo-control signal. The signal combiner 236 receives the dither signal and the servo-control signal and generates the phase-control signal 135, which is a combination of the servo-control signal with the dither signal. The DH module 280 generates a number of (e.g., seven) DH phase setpoints, one for each phase-modulator block (e.g., phase-modulator block 120). The DH module 280 generates the DH phase setpoints based on an optical feedback signal from the target light beam 207.

Figure 3:
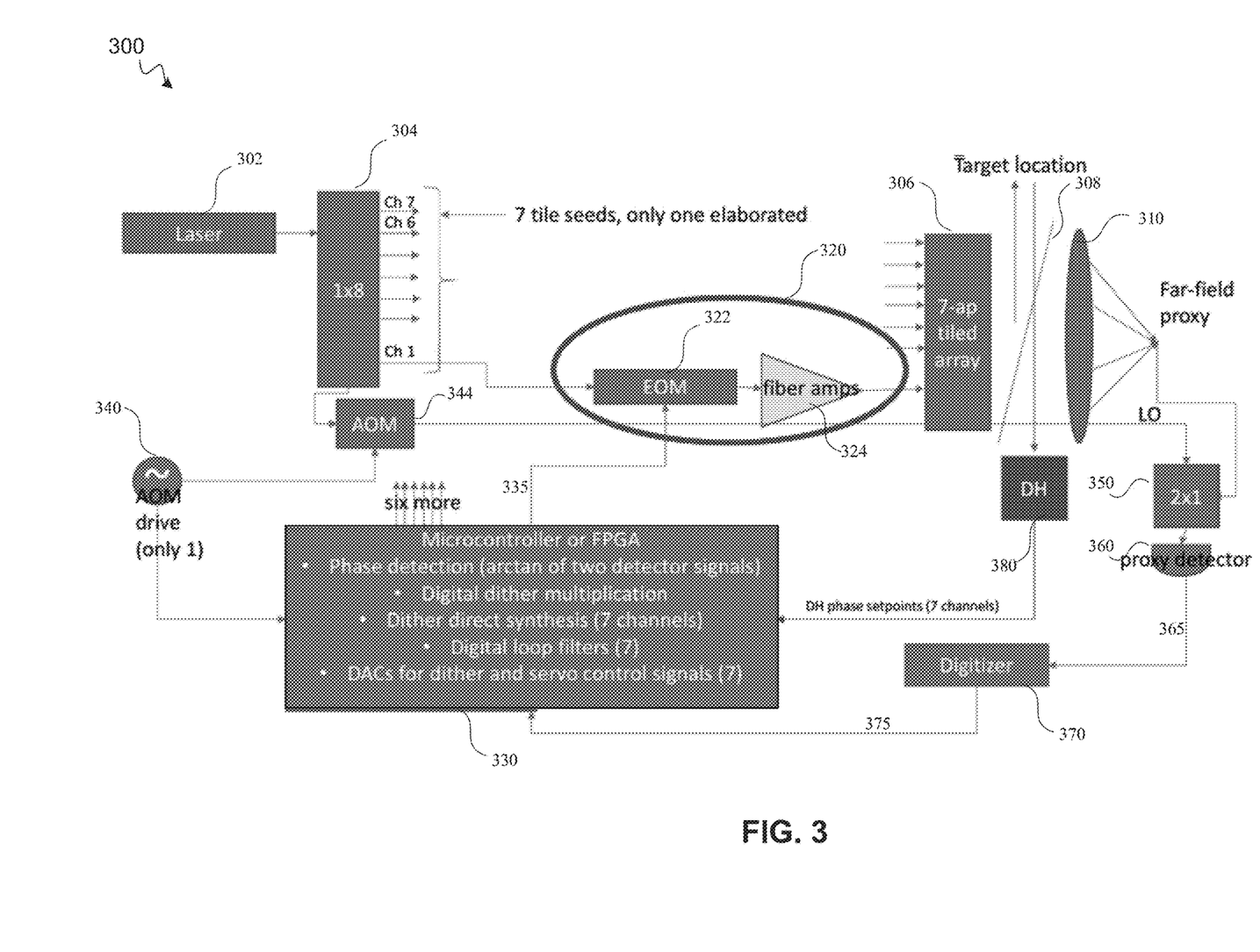
FIG. 3 is a schematic diagram illustrating an example hardware implementation of a DH mode, heterodyne phase-controlled beam-combining system, according to certain aspects of the disclosure.

FIG. 3 is a schematic diagram illustrating an example hardware implementation of a DH mode, heterodyne phase-controlled beam-combining system 300, according to certain aspects of the disclosure. The DH mode, heterodyne phase-controlled beam-combining system 300 (hereinafter "beam-combining system 300") is similar to the beam-combining system 100 of FIG. 1, except that the second Demux 170 of FIG. 1 is replaced with a digitizer 370 and a portion of the phase-modulator block 120 of FIG. 1 is replaced by a digital block 330. The beam-combining system 300 includes a laser source 302, a first beam splitter 304, a multi-aperture tiled array 306 (hereinafter "tiled array 306"), a second beam splitter 308, a lens 310, an AOM driver 340, an AOM 344, an EOM 322, an optical amplifier 324, an optical mixer 350, an optical detector (proxy detector) 360 and a DH module 380, which are similar to and perform similar functionalities to, respectively, the laser source 102, the first beam splitter 104, the tiled array 106, the second beam splitter 108, the lens 110, the AOM driver 140, the AOM 144, the EOM 122, the optical amplifier 124, the optical mixer 150, the optical detector 160 and the DH module 180 of FIG. 1. The EOM 322 and the optical amplifier 324 form a modulating block 320 that is used for each beamlet of the first beam splitter 304. The number of modulating blocks 320 is equal to the number of channels of the first beam splitter 304, and only one of them is shown here for simplicity.

The digitizer 370 is an analog-to-digital converter (ADC) that receives an electrical signal 365 of the optical detector 360 and converts it to a digital signal 375. The digital signal 375, an RF signal from the AOM drive 340 and DH phase setpoint signals (e.g., seven signals) of the DH module 380 are used as input signals to the digital block 330, which provides phase-control signals (e.g., 335) for the modulating blocks (e.g., the modulating blocks 320). The digital block 330 can be a microcontroller or be implemented in a field-programmable gate array (FPGA). The digital block 330 uses the input signals to perform the functionalities of the phase shifter 128, the first mixer 126, the second mixer 130, the dither generator 132, the loop filter 134 and the signal combiner 136 of FIG. 1. For example, the digital block 330 can perform phase detection, digital dither multiplication, dither direct synthesis (e.g., seven channels), digital loop filtering (e.g., as seven filters) and digital-to-analog conversions (DACs) for dither and servo-control signals (e.g., seven signals).

Figure 4:
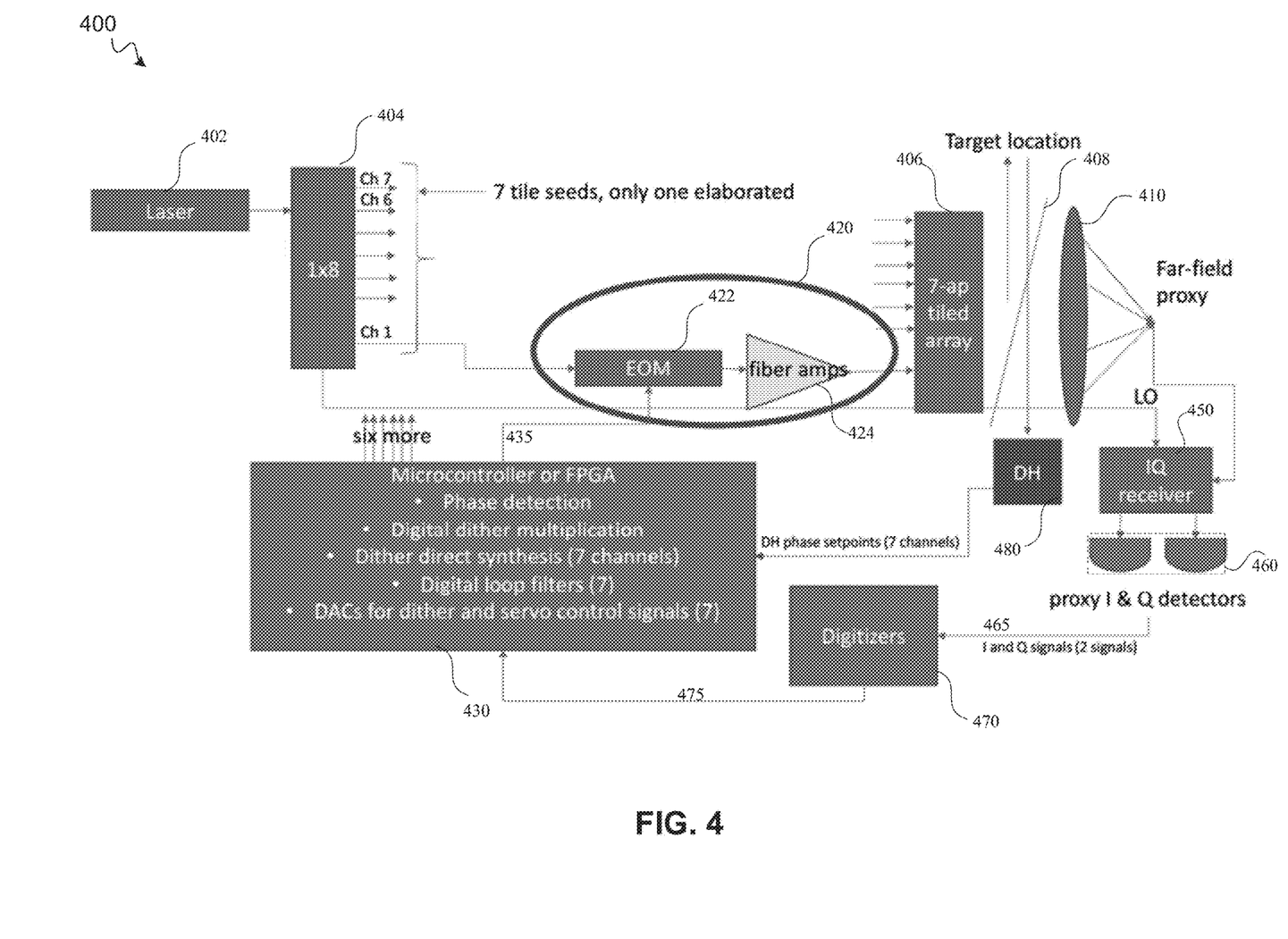
FIG. 4 is a schematic diagram illustrating an example hardware implementation of a DH mode, homodyne phase-controlled beam-combining system, according to certain aspects of the disclosure.

FIG. 4 is a schematic diagram illustrating an example hardware implementation of a DH mode, homodyne phase-controlled beam-combining system 400, according to certain aspects of the disclosure. The DH mode, homodyne phase-controlled beam-combining system 400 (hereinafter "beam-combining system 400") is similar to the beam-combining system 200 of FIG. 2, except that the Demux 270 of FIG. 2 is replaced with a digitizer 470 and a portion of the phase-modulator block 220 of FIG. 2 is replaced by a digital block 430. The beam-combining system 400 includes a laser source 402, a first beam splitter 404, a multi-aperture tiled array 406 (hereinafter "tiled array 406"), a second beam splitter 408, a lens 410, an EOM 422, an optical amplifier 424, an IQ receiver 450, an IQ light detector 460 and a DH module 480, which are similar to and perform similar functionalities to the laser source 202, the first beam splitter 204, the tiled array 206, the second beam splitter 208, the lens 210, the EOM 222, the optical amplifier 224, the IQ receiver 250, the IQ light detector 260 and the DH module 280 of FIG. 2. The EOM 422 and the optical amplifier 424 form a modulating block 420 that is used for each beamlet of the first beam splitter 404. The number of modulating blocks 420 is equal to the number of channels of the first beam splitter 404, and only one of them is shown here for simplicity.

The digitizer 470 is an ADC that receives an electrical signal 465 of the IQ light detector 460 and converts it to a digital signal 475. The digital signal 475 and DH phase setpoint signals (e.g., seven signals) of the DH module 480 are used as input signals to the digital block 430, which provides phase-control signals (e.g., 435) for the modulating blocks (e.g., the modulating blocks 320). The digital block 430 can be a microcontroller or be implemented in FPGA. The digital block 430 is similar to the digital block 330 of FIG. 3 and uses the input signals to perform the functionalities of the digital block 330, as described above with respect to FIG. 3.

Figure 5:
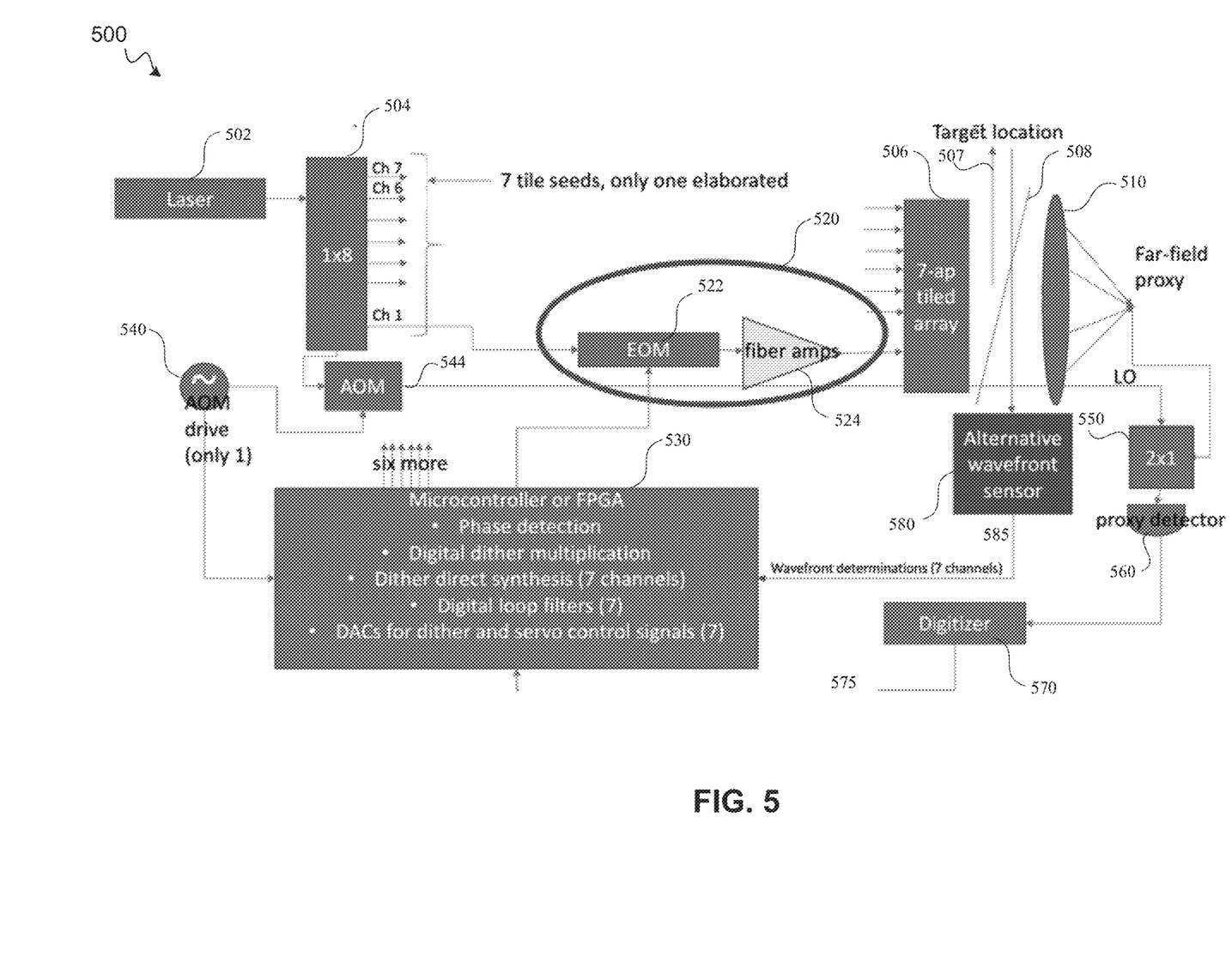
FIG. 5 is a schematic diagram illustrating an example hardware implementation of a heterodyne phase-controlled beam-combining system, according to certain aspects of the disclosure.

FIG. 5 is a schematic diagram illustrating an example hardware implementation of a heterodyne phase-controlled beam-combining system 500, according to certain aspects of the disclosure. The heterodyne phase-controlled beam-combining system 500 (hereinafter "beam-combining system 500") is similar to the beam-combining system 300 of FIG. 3, except that the DH module 380 is replaced with an alternative waveform sensor 580. The beam-combining system 500 includes a laser source 502, a first beam splitter 504, a multi-aperture tiled array 506 (hereinafter "tiled array 506"), a second beam splitter 508, a lens 510, an AOM driver 540, an AOM 544, an EOM 522, an optical amplifier 524, an optical mixer 550, an optical detector (proxy detector) 560, a digitizer 570 and a digital block 530, which are similar to and perform similar functionalities to, respectively, the laser source 302, the first beam splitter 304, the tiled array 306, the second beam splitter 308, the lens 310, the AOM driver 340, the AOM 344, the EOM 322, the optical amplifier 324, the optical mixer 350, the optical detector 360, the digitizer 370 and the digital block 330 of FIG. 3. The EOM 522 and the optical amplifier 524 form a modulating block 520 that is used for each beamlet of the first beam splitter 504. The number of modulating blocks 520 is equal to the number of channels of the first beam splitter 504, and only one of them is shown here for simplicity. The alternative waveform sensor 580 can generate a number of (e.g., seven) waveform determination signals 585, one for each phase-modulator block (e.g., phase-modulator block 520). The alternative waveform sensor 580 generates the waveform determination signals 585 based on an optical feedback signal from the target light beam 507. In one or more implementations, the alternative waveform sensor 580 can be any returning optical waveform sensor such as a Shack-Hartmann sensor or other sensors.

Figure 6:
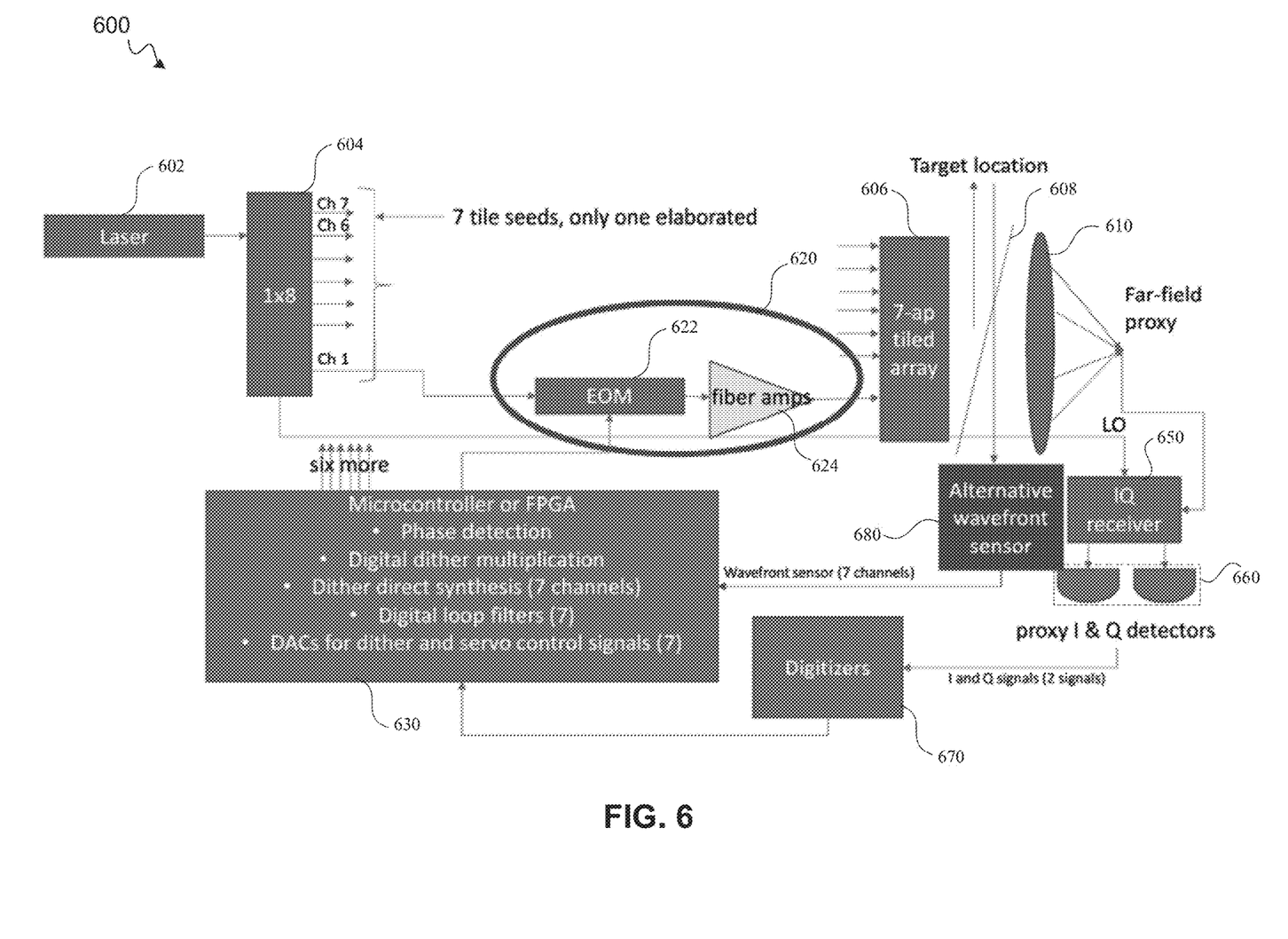
FIG. 6 is a schematic diagram illustrating an example hardware implementation of a homodyne phase-controlled beam-combining system, according to certain aspects of the disclosure.

FIG. 6 is a schematic diagram illustrating an example hardware implementation of a homodyne phase-controlled beam-combining system 600, according to certain aspects of the disclosure. The homodyne phase-controlled beam-combining system 600 (hereinafter "beam-combining system 600") is similar to the beam-combining system 400 of FIG. 4, except that the DH module 480 is replaced with an alternative waveform sensor 680. The beam-combining system 600 includes a laser source 602, a first beam splitter 604, a multi-aperture tiled array 606 (hereinafter "tiled array 606"), a second beam splitter 608, a lens 610, an EOM 622, an optical amplifier 624, an IQ receiver 650, an IQ light detector 660, a digitizer 670 and a digital block 630, which are similar to and perform similar functionalities, respectively, to the laser source 402, the first beam splitter 404, the tiled array 406, the second beam splitter 408, the lens 410, the EOM 422, the optical amplifier 424, the IQ receiver 450, the IQ light detector 460, the digitizer 470 and the digital block 430 of FIG. 4. The EOM 622 and the optical amplifier 524 form a modulating block 620 that is used for each beamlet of the first beam splitter 604. The number of modulating blocks 620 is equal to the number of channels of the first beam splitter 604, and only one of them is shown here for simplicity. The alternative waveform sensor 680 is similar to the alternative waveform sensor 580 of FIG. 5 and performs similar functionalities as described above with respect to FIG. 5. In one or more implementations, the alternative waveform sensor 680 can be any returning optical waveform sensor such as a Shack-Hartmann sensor or other sensors.

Figure 7:
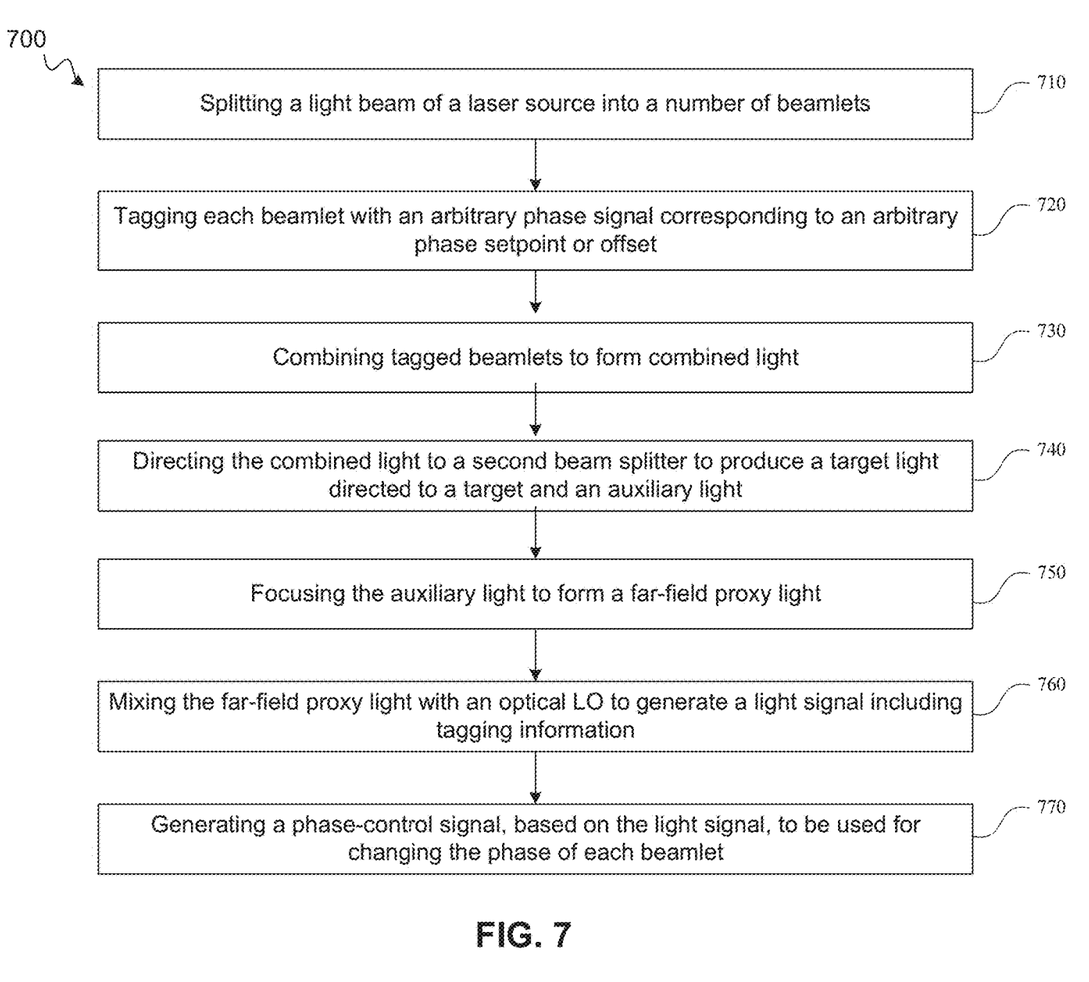
FIG. 7 is a flow diagram illustrating an example method for combining phase-controlled beams, according to certain aspects of the disclosure.

FIG. 7 is a flow diagram illustrating an example method 700 for combining phase-controlled beams, according to certain aspects of the disclosure. The method 700 of combining phase-controlled beams includes splitting a light beam of a laser source (e.g., 102 of FIG. 1) into a number of beamlets (e.g., 105 of FIG. 1) (710), and tagging (e.g., by 122 of FIG. 1) each beamlet with an arbitrary phase signal corresponding to an arbitrary phase setpoint or offset (720). The method also includes combining (e.g., by 106 of FIG. 1) tagged beamlets to form combined light (730) and directing the combined light to a second beam splitter (e.g., 108 of FIG. 1) to produce a target light (e.g., 107 of FIG. 1) directed to a target and an auxiliary light (740). The method further includes focusing (e.g., by 110 of FIG. 1) the auxiliary light to form a far-field proxy light (e.g., 105 of FIG. 1) (750), and mixing (e.g., by 150 of FIG. 1) the far-field proxy light with an optical LO (e.g., 145 of FIG. 1) to generate a light signal including tagging information (760). A phase-control signal (e.g., 135 of FIG. 1) is generated based on the light signal (770). The phase-control signal is used for changing the phase of each beamlet.

In some aspects, the subject technology may be used in various markets, including, for example, and without limitation, the control systems, electronics and weapons technologies markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A heterodyne phase-controlled beam-combiner system, the system comprising:
   a laser source configured to generate a light beam;
   a first beam splitter configured to split the light beam into a plurality of beamlets;
   a plurality of phase modulators, a phase modulator of the plurality of phase modulators is configured to tag each beamlet of the plurality of beamlets with an arbitrary phase dither signal;
   a tiled array including a plurality of lenslets and configured to combine tagged beamlets and direct combined light to a second beam splitter;
   an optical mixer configured to generate a heterodyne light including tagging information; and
   an optical element configured to focus a second output light of the second beam splitter to form a far-field proxy light,
   wherein,
      the phase dither signal is about an arbitrary phase setpoint or offset,
      a first output light of the second beam splitter comprises a target light directed to a target, and
      the arbitrary phase offset is configured to achieve a desired intensity profile at a location of the target.

2. The system of claim 1, further comprising a wavefront sensor module configured to generate phase setpoint signals for use by the phase modulator to achieve a desired intensity of the target light.

3. The system of claim 2, wherein the wavefront sensor module comprises a digital holography (DH) module.

4. The system of claim 2, wherein the wavefront sensor module comprises returning optical-waveform sensors, and wherein the returning optical-waveform sensors comprise Shack-Hartmann sensors.

5. The system of claim 1, wherein the optical mixer is configured to mix the far-field proxy light with an optical local oscillator (LO) to generate the heterodyne light.

6. The system of claim 5, further comprising an optical detector configured to convert the heterodyne light into a heterodyne electrical signal.

7. The system of claim 1, wherein each phase modulator of the plurality of phase modulators includes an electro-optical modulator (EOM), wherein the EOM is configured to produce the arbitrary phase offset based on a phase-control signal.

8. The system of claim 7, wherein each phase modulator of the plurality of phase modulators is driven by an electrical module that is configured to generate the phase-control signal.

9. The system of claim 8, wherein the phase-control signal comprises a dither signal combined with a servo-control signal.

10. The system of claim 9, wherein the electrical module comprises a phase shifter, a first mixer, a second mixer, a dither generator, a loop filter and a signal combiner, wherein the dither generator is configured to generate a dither signal, and the signal combiner is configured to combine the dither signal with the servo-control signal, and wherein the loop filter is configured to receive an error signal from the second mixer and provide the servo-control signal.

11. The system of claim 9, wherein the electrical module is implemented by one of a microcontroller or an FPGA.

12. The system of claim 8, wherein the electrical module is implemented by one of a microcontroller or a field-programmable gate array (FPGA).

13. A homodyne phase-controlled beam-combiner system, the system comprising:
   a first beam splitter configured to split a light beam into a plurality of beamlets;
   a plurality of phase modulators, a phase modulator of the plurality of phase modulators is configured to tag each beamlet of the plurality of beamlets with an arbitrary phase dither signal;
   a tiled array including a plurality of lenslets and configured to combine tagged beamlets to form a combined light and direct the combined light to a second beam splitter; and
   an inphase-quadrature (IQ) receiver configured to generate I and Q light signals including tagging information,
   wherein,
      the arbitrary phase dither signal corresponds to an arbitrary phase setpoint or offset,
      a first output light of the second beam splitter comprises a target light directed to a target, and
      the arbitrary phase offset is configured to achieve a phase profile for the plurality of beamlets that produces a desired profile of the target light.

14. The system of claim 13, further comprising a wavefront sensor module configured to generate phase setpoint signals for use by the phase modulator to achieve maximizing the on-axis far-field intensity of the target light, wherein the wavefront sensor module comprises one of a DH module or returning optical-waveform sensors, and wherein the returning optical-waveform sensors comprise Shack-Hartmann sensors.

15. The system of claim 13, further comprising an optical element configured to focus a second output light of the second beam splitter to form a far-field proxy light, and wherein the IQ receiver is configured to mix the far-field proxy light with an optical local oscillator (LO) to generate the I and Q light signals.

16. The system of claim 15, further comprising an IQ light detector configured to convert the I and Q light signals into I and Q electrical signals.

17. The system of claim 13, wherein each phase modulator of the plurality of phase modulators includes an EOM, wherein the EOM is configured to control an optical phase based on a phase-control signal generated by an electrical module, and wherein the phase-control signal comprises a dither signal combined with a servo-control signal.

18. The system of claim 17, wherein the electrical module comprises a phase shifter, an IQ demodulator, a dither generator, a loop filter and a signal combiner, wherein the dither generator is configured to generate the dither signal, and the signal combiner configured to combine the dither signal with the servo-control signal, and wherein the loop filter is configured to receive an error signal from the IQ demodulator and provide the servo-control signal.

19. A method of combining phase-controlled beams, the method comprising:
- splitting a light beam of a laser source into a plurality of beamlets;
- tagging each beamlet of the plurality of beamlets with an arbitrary phase dither signal corresponding to an arbitrary phase setpoint or offset;
- combining tagged beamlets to form combined light and directing the combined light to a second beam splitter to produce a target light directed to a target and an auxiliary light;
- focusing the auxiliary light to form a far-field proxy light;
- mixing the far-field proxy light with an optical local oscillator (LO) to generate a light signal including tagging information; and
- generating a phase-control signal based on the light signal and using the phase-control signal to change a phase of each beamlet of the plurality of beamlets.

* * * * *